US012699961B1

(12) United States Patent　　　(10) Patent No.:　US 12,699,961 B1
Sharma et al.　　　　　　　　　　(45) Date of Patent:　　　Aug. 4, 2026

(54) SYSTEMS AND METHODS OF SUPPLY DISTRIBUTION OPTIMIZATION DRIVEN REVERSE LOGISTICS

(71) Applicant: Blue Yonder Group, Inc., Scottsdale, AZ (US)

(72) Inventors: Abhijeet Sharma, Khandwa (IN); Mayank Tiwari, Serilingampalle (IN); Pankaj Rathoure, Shajapur (IN); Priyanka Koushik, Irving, TX (US); Raghuveer Prasad Nagar, Kota (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 103 days.

(21) Appl. No.: 18/674,403

(22) Filed: May 24, 2024

Related U.S. Application Data

(60) Provisional application No. 63/531,135, filed on Aug. 7, 2023, provisional application No. 63/529,568, filed on Jul. 28, 2023, provisional application No. 63/529,068, filed on Jul. 26, 2023.

(51) Int. Cl.
　　*G06Q 10/087*　　　(2023.01)
　　*G06Q 30/0202*　　 (2023.01)
(52) U.S. Cl.
　　CPC ....... *G06Q 10/087* (2013.01); *G06Q 30/0202* (2013.01)
(58) Field of Classification Search
　　CPC .......................... G06Q 10/087; G06Q 30/0202
　　See application file for complete search history.

(56) References Cited

U.S. PATENT DOCUMENTS

| | | | |
|---|---|---|---|
| 7,596,516 B2 * | 9/2009 | Starkowsky | G06Q 10/087 |
| | | | 705/302 |
| 9,652,732 B1 | 5/2017 | Barstad et al. | |
| 11,030,674 B2 | 6/2021 | Nair et al. | |
| 11,205,181 B2 | 12/2021 | Agasti et al. | |
| 2002/0010634 A1 * | 1/2002 | Roman | G06Q 10/0837 |
| | | | 705/14.1 |
| 2004/0117384 A1 | 6/2004 | Ray | |
| 2022/0245574 A1 * | 8/2022 | Cella | G06Q 10/087 |
| 2024/0242171 A1 * | 7/2024 | Sasaki | G06Q 10/0837 |

FOREIGN PATENT DOCUMENTS

WO　　　2001057613 A2　　8/2001

* cited by examiner

*Primary Examiner* — Garcia Ade
(74) *Attorney, Agent, or Firm* — Spencer Fane LLP; Steven J. Laureanti

(57) ABSTRACT

A system and method are disclosed for reverse logistics of inventory. The method includes identifying existing reverse logistics contracts, predicting demand for items sold, predicting that a first supply chain entity is likely to have excess inventory for the items based on an expected future inventory of the items and the predicted demand for the items, notifying other supply chain entities of the predicted excess inventory at the first supply chain entity, predicting an inventory shortage at a second supply chain entity of the supply chain network, comparing a cost of transferring the excess inventory to the second supply chain entity with a cost of other options of obtaining additional inventory, in response to determining that the cost of transferring the predicted excess inventory is less than the cost of the other options, generating a reverse logistics plan, and initiating and executing the reverse logistics plan.

20 Claims, 5 Drawing Sheets

FIG. 2

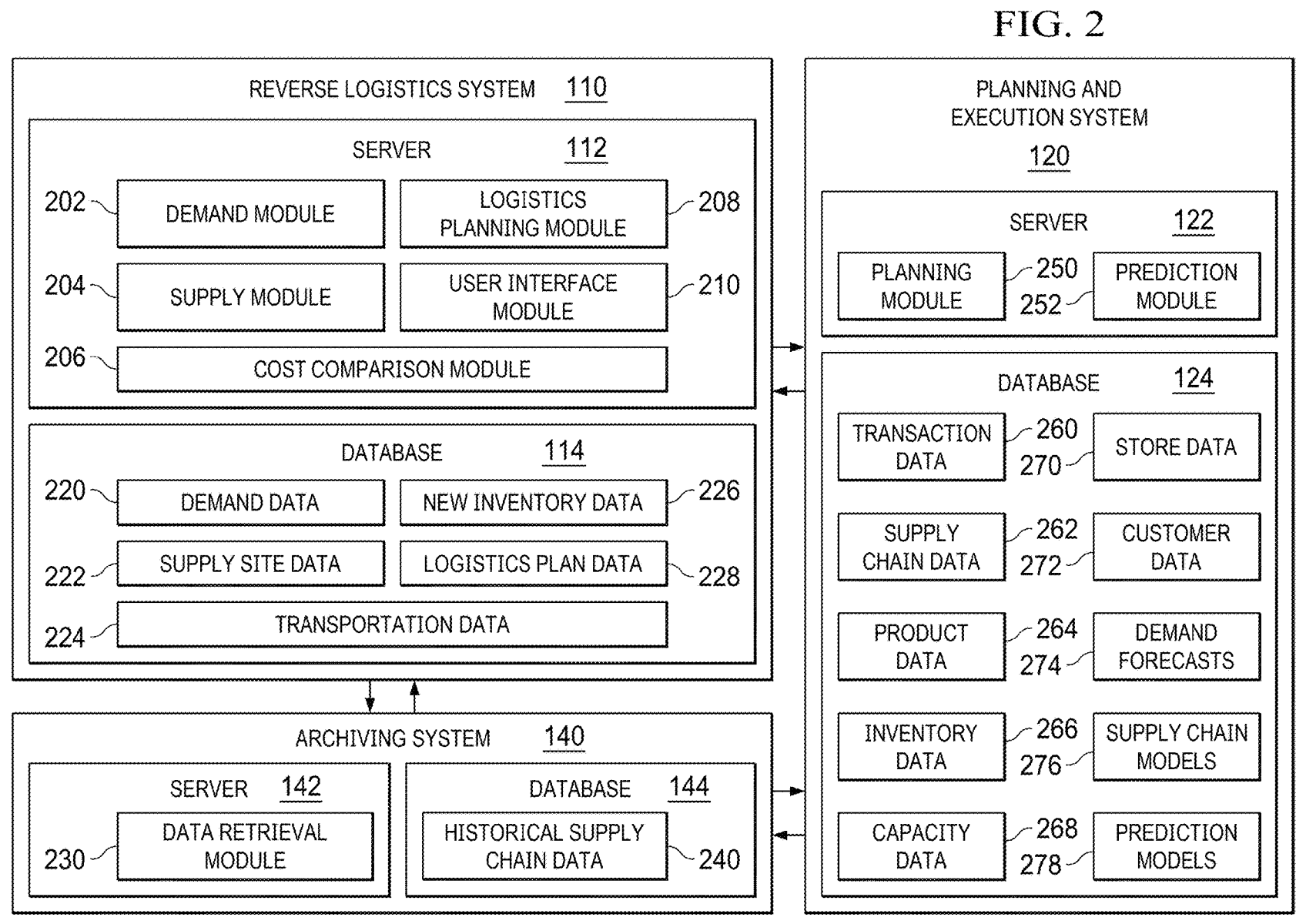

PLANNING AND EXECUTION SYSTEM 120

SERVER 122

- PLANNING MODULE 250
- PREDICTION MODULE 252

DATABASE 124

- TRANSACTION DATA 260
- STORE DATA 270
- SUPPLY CHAIN DATA 262
- CUSTOMER DATA 272
- PRODUCT DATA 264
- DEMAND FORECASTS 274
- INVENTORY DATA 266
- SUPPLY CHAIN MODELS 276
- CAPACITY DATA 268
- PREDICTION MODELS 278

REVERSE LOGISTICS SYSTEM 110

SERVER 112

- DEMAND MODULE 202
- LOGISTICS PLANNING MODULE 208
- SUPPLY MODULE 204
- USER INTERFACE MODULE 210
- COST COMPARISON MODULE 206

DATABASE 114

- DEMAND DATA 220
- NEW INVENTORY DATA 226
- SUPPLY SITE DATA 222
- LOGISTICS PLAN DATA 228
- TRANSPORTATION DATA 224

ARCHIVING SYSTEM 140

SERVER 142

- DATA RETRIEVAL MODULE 230

DATABASE 144

- HISTORICAL SUPPLY CHAIN DATA 240

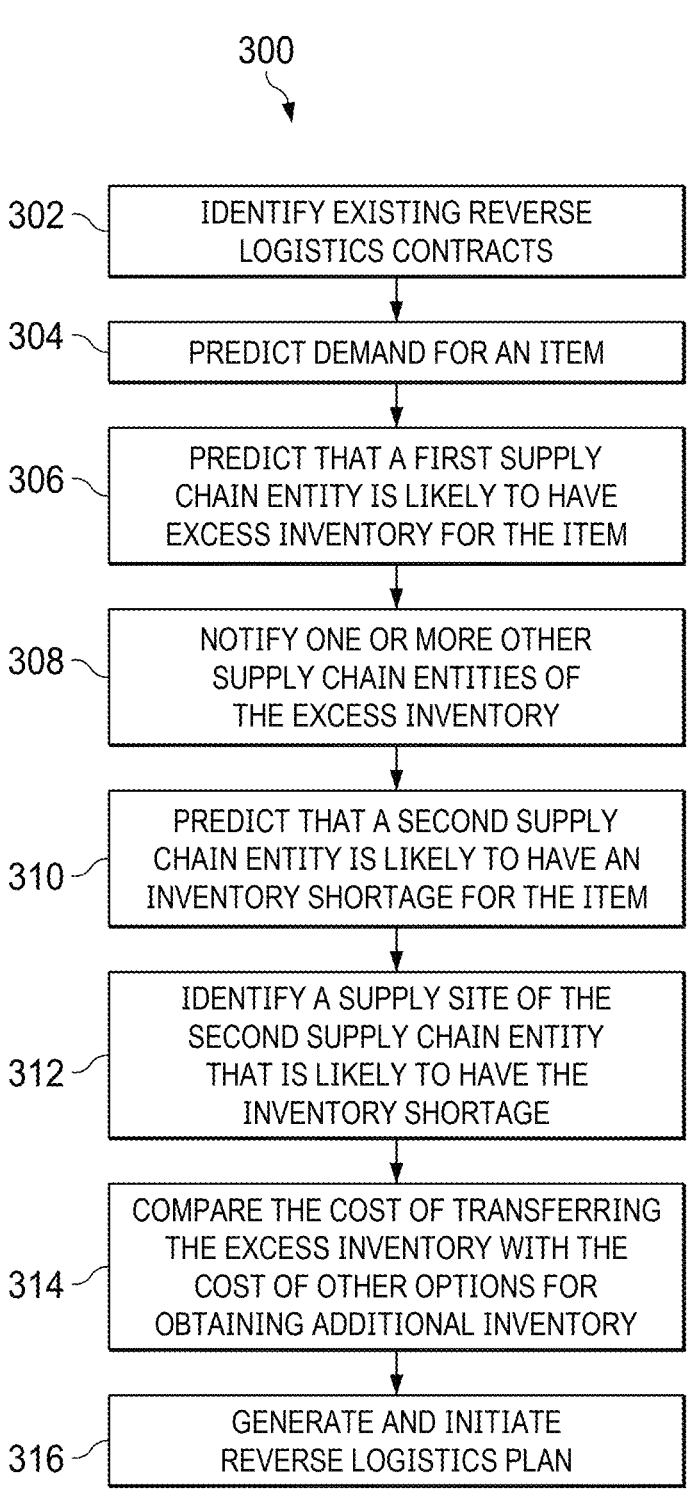

300

302 — IDENTIFY EXISTING REVERSE LOGISTICS CONTRACTS

304 — PREDICT DEMAND FOR AN ITEM

306 — PREDICT THAT A FIRST SUPPLY CHAIN ENTITY IS LIKELY TO HAVE EXCESS INVENTORY FOR THE ITEM

308 — NOTIFY ONE OR MORE OTHER SUPPLY CHAIN ENTITIES OF THE EXCESS INVENTORY

310 — PREDICT THAT A SECOND SUPPLY CHAIN ENTITY IS LIKELY TO HAVE AN INVENTORY SHORTAGE FOR THE ITEM

312 — IDENTIFY A SUPPLY SITE OF THE SECOND SUPPLY CHAIN ENTITY THAT IS LIKELY TO HAVE THE INVENTORY SHORTAGE

314 — COMPARE THE COST OF TRANSFERRING THE EXCESS INVENTORY WITH THE COST OF OTHER OPTIONS FOR OBTAINING ADDITIONAL INVENTORY

316 — GENERATE AND INITIATE REVERSE LOGISTICS PLAN

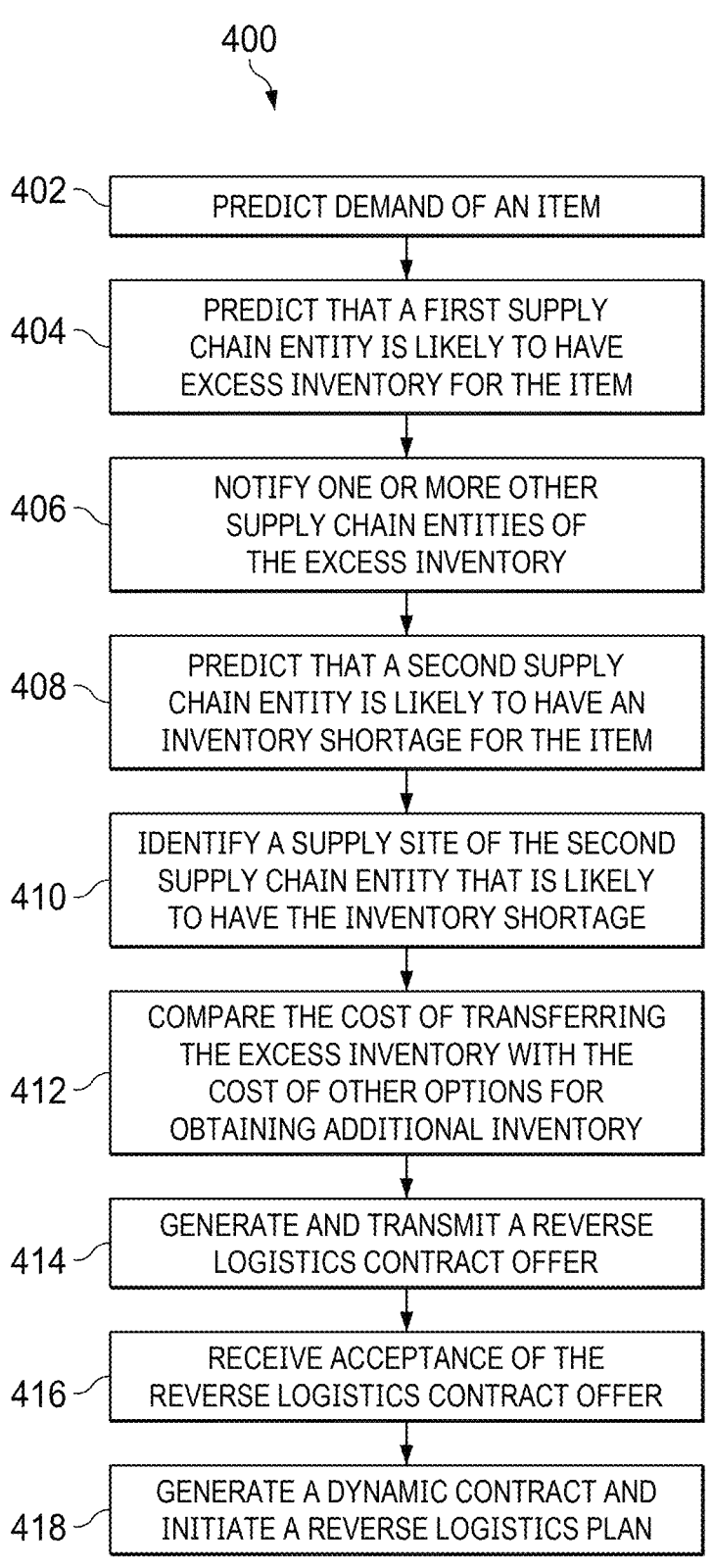

402 — PREDICT DEMAND OF AN ITEM

404 — PREDICT THAT A FIRST SUPPLY CHAIN ENTITY IS LIKELY TO HAVE EXCESS INVENTORY FOR THE ITEM

406 — NOTIFY ONE OR MORE OTHER SUPPLY CHAIN ENTITIES OF THE EXCESS INVENTORY

408 — PREDICT THAT A SECOND SUPPLY CHAIN ENTITY IS LIKELY TO HAVE AN INVENTORY SHORTAGE FOR THE ITEM

410 — IDENTIFY A SUPPLY SITE OF THE SECOND SUPPLY CHAIN ENTITY THAT IS LIKELY TO HAVE THE INVENTORY SHORTAGE

412 — COMPARE THE COST OF TRANSFERRING THE EXCESS INVENTORY WITH THE COST OF OTHER OPTIONS FOR OBTAINING ADDITIONAL INVENTORY

414 — GENERATE AND TRANSMIT A REVERSE LOGISTICS CONTRACT OFFER

416 — RECEIVE ACCEPTANCE OF THE REVERSE LOGISTICS CONTRACT OFFER

418 — GENERATE A DYNAMIC CONTRACT AND INITIATE A REVERSE LOGISTICS PLAN

| | CALCULATE COST OF OBTAINING NEW INVENTORY VIA OPTIONS OTHER THAN REVERSE LOGISTICS |
| 502 | |

| | CALCULATE TRANSPORTATION COST FOR PERFORMING REVERSE LOGISTICS FOR OBTAINING NEW INVENTORY |
| 504 | |

| | CALCULATE TOTAL INBOUND COST FOR REVERSE LOGISTICS OF EXCESS INVENTORY |
| 506 | |

SYSTEMS AND METHODS OF SUPPLY DISTRIBUTION OPTIMIZATION DRIVEN REVERSE LOGISTICS

CROSS-REFERENCE TO RELATED APPLICATIONS

The present disclosure is related to that disclosed in U.S. Provisional Application No. 63/531,135, filed Aug. 7, 2023, entitled "Systems and Methods of Supply Distribution Optimization Driven Reverse Logistics," U.S. Provisional Application No. 63/529,568, filed Jul. 28, 2023, entitled "Bundle Return Optimization System," and U.S. Provisional Application No. 63/529,068, filed Jul. 26, 2023, entitled "Reverse Sourcing of Product Returns Based on Restorage Cost Models." U.S. Provisional Application Nos. 63/531,135, 63/529,568, and 63/529,068 are assigned to the assignee of the present application. The present invention hereby claims priority under 35 U.S.C. § 119(e) to U.S. Provisional Application Nos. 63/531,135, 63/529,568, and 63/529,068.

TECHNICAL FIELD

The present disclosure relates generally to supply chain logistics and more specifically to reverse sourcing product returns in a supply chain network.

BACKGROUND

Enterprises procure inventory from a variety of upstream sources in a supply chain network, such as suppliers, manufacturers, and distribution centers. To determine quantities of items to procure, enterprises typically rely on predicted demand to reduce transportation and storage inefficiencies. However, enterprises may still encounter situations of having insufficient inventory to meet actual demands or having a substantial excess of inventory. In situations where an enterprise has insufficient inventory to meet demand, existing logistics systems provide for obtaining additional inventory from upstream sources when such additional inventory is available. On the other hand, in situations where an enterprise has a substantial excess of inventory, existing logistics systems provide for disposing of the excess inventory or selling the excess inventory at markdown. Use of existing logistics systems thus results in inefficiencies that lead to lost sales and lost profit, both of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 2 illustrates the reverse logistics system, the archiving system, and the planning and execution system of FIG. 1 in greater detail, in accordance with an embodiment;

FIG. 3 illustrates a method for reverse logistics of inventory, in accordance with an embodiment;

FIG. 4 illustrates a method for reverse logistics of inventory using dynamic contracting, in accordance with an embodiment.

DETAILED DESCRIPTION

Figure 1:
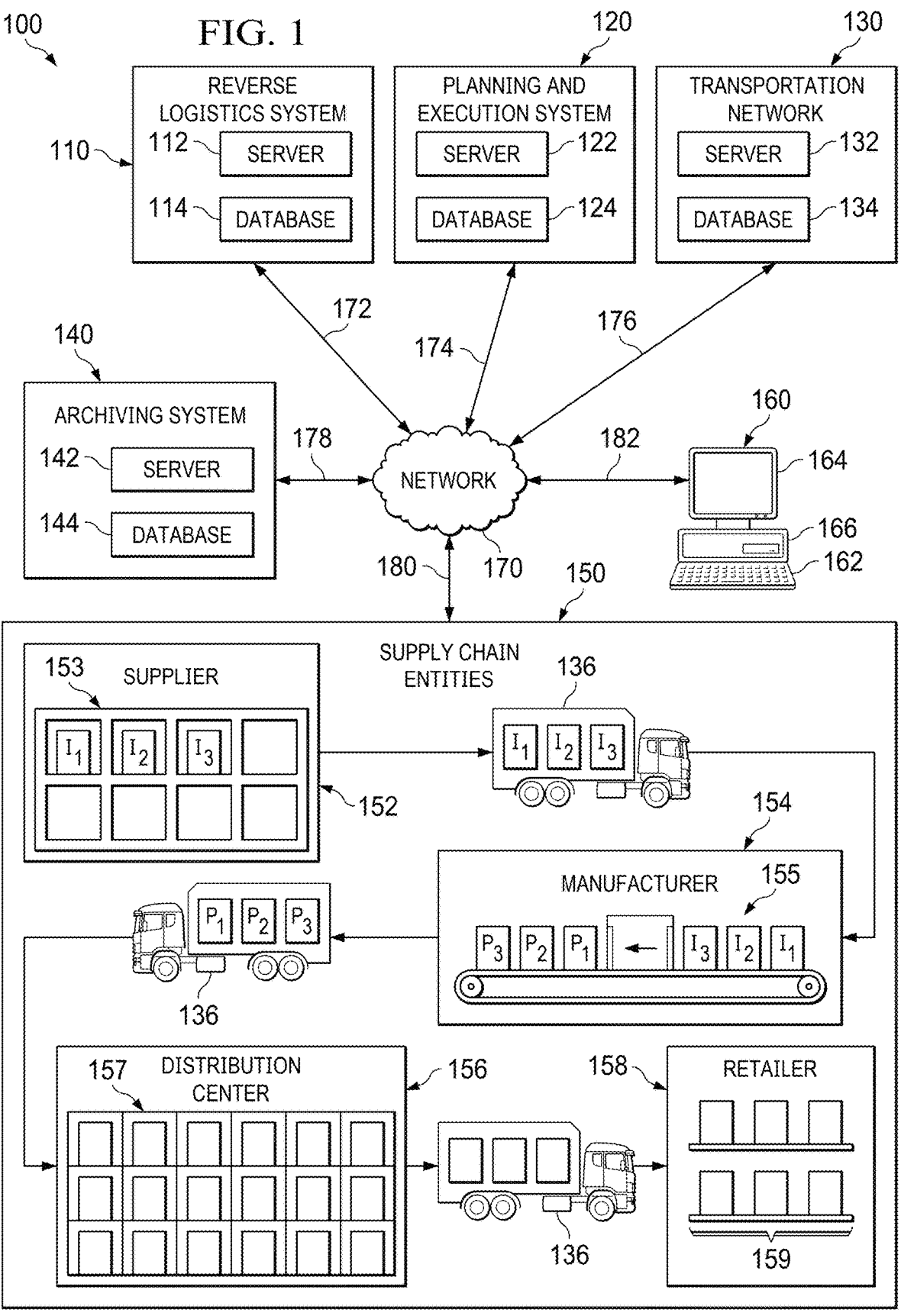
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide systems and methods to perform reverse logistics of inventory in supply chain networks. Embodiments evaluate demand for a particular item to determine whether there are likely to be inventory surpluses and shortages of the item at one or more supply chain entities. Systems and methods disclosed herein may compare the cost to transfer inventory from a supply chain entity with an inventory surplus to a supply chain entity with an inventory shortage, which may be upstream from the supply chain entity with the inventory surplus, with the cost of the supply chain entity with the inventory shortage to obtain inventory via other methods. Embodiments may generate a reverse logistics plan for supply chain entities in accordance with established reverse logistics contracts, or may use a dynamic contracting system for supply chain entities without existing contracts to generate a reverse logistics plan.

Embodiments of the following disclosure enable systems and methods to identify demand at a particular supply chain entity and transfer high demand and high value products to the supply chain entity in an efficient way. Use of embodiments may provide for optimized inventory holding processes, making such processes more efficient, more cost effective, and less time consuming. Use of embodiments may further improve overall demand fulfillment of a supply chain network by improving inventory availability at supply chain entities that are most in need of such items, which may in turn improve customer loyalty to the supply chain entities.

FIG. 1 illustrates supply chain network 100, in accordance with a first embodiment. Supply chain network 100 comprises reverse logistics system 110, planning and execution system 120, transportation network 130, archiving system 140, one or more supply chain entities 150, one or more computers 160, network 170, and one or more communication links 172-182. Although a single reverse logistics system 110, a single planning and execution system 120, a single transportation network 130, a single archiving system 140, one or more supply chain entities 150, one or more computers 160, a single network 170, and one or more communication links 172-182 are shown and described, embodiments contemplate any number of reverse logistics systems, planning and execution systems, transportation networks, archiving systems, supply chain entities, computers, networks, or communication links, according to particular needs.

In one embodiment, reverse logistics system 110 comprises server 112 and database 114. Although reverse logistics system 110 is shown as comprising a single server 112 and a single database 114, embodiments contemplate reverse logistics system 110 including any suitable number of servers, databases, serverless computing options, or data stores internal to, or externally coupled with, reverse logistics system 110, according to particular needs. For the purposes of this disclosure, all instances of "server" are understood to include, according to embodiments, one or more embodiments of servers, serverless computing options, and/or other computing solutions, and all instances of "database" are understood to include, according to embodiments, databases, datastores, data stores, and/or other data storage systems, according to particular needs. In embodiments, reverse logistics system 110 generates a reverse logistics plan for one or more items sold in supply chain network 100. As explained in more detail below, reverse logistics system 110 may determine, based on one or more demand forecasts, a first supply chain entity of one or more supply chain entities 150 that is likely to have an inventory surplus or excess inventory supply for an item, and a second supply chain entity of one or more supply chain entities 150 that is likely to have an inventory shortage for the item, which may be upstream from the first supply chain entity. Reverse logistics system 110 may further compare a cost of transferring inventory of the item via reverse logistics from the first supply chain entity to the second supply chain entity with obtaining additional inventory for the item at the second supply chain entity via other options. When the reverse logistics cost is less than the cost to obtain inventory via other options, reverse logistics system 110 generates and implements a reverse logistics plan to transfer inventory from the first supply chain entity to the second supply chain entity.

According to an embodiment, planning and execution system 120 comprises server 122 and database 124. Supply chain planning and execution is typically performed by several distinct and dissimilar processes, including, for example, strategic assortment planning, demand planning, operations planning, production planning, supply planning, distribution planning, execution, pricing, forecasting, transportation management, warehouse management, inventory management, fulfilment, procurement, and the like. Server 122 of planning and execution system 120 comprises one or more modules, such as, for example, planning module 250 (FIG. 2), a solver, a modeler, and/or an engine, for performing actions of one or more planning and execution processes. Server 122 stores and retrieves data from database 124 or from one or more locations in supply chain network 100. In addition, planning and execution system 120 operates on one or more computers 160 that are integral to, or separate from, the hardware and/or software that support archiving system 140 and one or more supply chain entities 150. In an embodiment, server 122 of planning and execution system 120 is configured to receive and transmit item data, including item identifiers, pricing data, attribute data, inventory levels, and other like data about one or more items at one or more locations in supply chain network 100. Server 122 stores and retrieves item data from database 124 or one or more locations in supply chain network 100.

Transportation network 130 comprises server 132 and database 134. According to embodiments, transportation network 130 directs one or more transportation vehicles 136 to ship one or more items from one or more stocking locations of one or more supply chain entities 150. In embodiments, one or more transportation vehicles 136 comprise a truck fleet used for performing deliveries. In addition, the number of items shipped by one or more transportation vehicles 136 in transportation network 130 may also be based, at least in part, on the number of items currently in stock at one or more stocking locations of one or more supply chain entities 150, the number of items currently in transit, a forecasted demand, a supply chain disruption, and/or the like. One or more transportation vehicles 136 may comprise, for example, any number of trucks, cars, vans, boats, airplanes, unmanned aerial vehicles (UAVs), cranes, robotic machinery, or the like. According to embodiments, one or more transportation vehicles 136 may be associated with one or more supply chain entities 150 and may be directed by automated navigation including, for example, GPS guidance, according to particular needs.

Archiving system 140 of supply chain network 100 comprises server 142 and database 144. Although archiving system 140 is shown as comprising a single server 142 and a single database 144, embodiments contemplate any suitable number of servers or databases internal to, or externally coupled with, archiving system 140. Server 142 of archiving system 140 may support one or more processes for receiving and storing data from planning and execution system 120, one or more supply chain entities 150, and/or one or more computers 160 of supply chain network 100, as described in more detail herein. According to some embodiments, archiving system 140 comprises an archive of data received from planning and execution system 120, one or more supply chain entities 150, and/or one or more computers 160 of supply chain network 100. Archiving system 140 provides archived data to reverse logistics system 110 and/or planning and execution system 120 to, for example, train one or more machine learning models. Server 142 may store the received data in database 144. Database 144 of archiving system 140 may comprise one or more databases or other data storage arrangements at one or more locations local to, or remote from, server 142.

One or more supply chain entities 150 may represent one or more suppliers 152, one or more manufacturers 154, one or more distribution centers 156, and one or more retailers 158 in one or more supply chain networks, including one or more enterprises. Each of one or more supply chain entities 150 may comprise Internet of things (IoT) sensors, which may automatically transmit conditions (e.g., location, temperature, etc.) of any object to reverse logistics system 110 or any other system or device of supply chain network 100. The IoT sensors may transmit condition data periodically (e.g., every minute, every hour, or every day), or may transmit condition data in response to a change (e.g., a door of a container being opened or closed).

One or more suppliers 152 may be any suitable entity that offers to sell or otherwise provides one or more items or components to one or more manufacturers 154 or buyers. One or more suppliers 152 may, for example, receive an item from a first supply chain entity of one or more supply chain entities 150 in supply chain network 100 and provide the item to another supply chain entity of one or more supply chain entities 150. Items may comprise, for example, components, materials, products, parts, supplies, or other items that may be used to produce products. In addition, or as an alternative, an item may comprise a supply or resource that is used to manufacture the item but does not become a part of the item. One or more suppliers 152 may comprise automated distribution systems 153 that automatically transport items to one or more manufacturers 154 based, at least in part, on a supply chain plan, a material or capacity reallocation, current and projected inventory levels, and/or one or more additional factors described herein.

One or more manufacturers 154 may be any suitable entity that manufactures at least one product. One or more manufacturers 154 may use one or more items during the manufacturing process to produce any manufactured, fabricated, assembled, or otherwise processed item, material, component, good, or product. In one embodiment, a product represents an item ready to be supplied to, for example, another supply chain entity of one or more supply chain entities 150, such as one or more suppliers 152, an item that needs further processing, or any other item. One or more manufacturers 154 may, for example, produce and sell a product to one or more suppliers 152, another one or more manufacturers 154, one or more distribution centers 156, one or more retailers 158, a customer, or any other suitable entity. One or more manufacturers 154 may comprise automated robotic production machinery 155 that produce products based, at least in part, on a supply chain plan, a material or capacity reallocation, current and projected inventory levels, and/or one or more additional factors described herein.

One or more distribution centers 156 may be any suitable entity that offers to sell or otherwise distributes at least one product to one or more retailers 158 and/or customers. One or more distribution centers 156 may, for example, receive a product from a first supply chain entity of one or more supply chain entities 150 in supply chain network 100 and store and transport the product for a second supply chain entity of one or more supply chain entities 150. One or more distribution centers 156 may comprise automated warehousing systems 157 that automatically transport products to one or more retailers 158 or customers and/or automatically remove an item from, or place an item into, inventory based, at least in part, on a supply chain plan, a material or capacity reallocation, current and projected inventory levels, and/or one or more additional factors described herein.

One or more retailers 158 may be any suitable entity that obtains one or more products to sell to one or more customers. In addition, one or more retailers 158 may sell, store, and supply one or more components and/or repair a product with one or more components. One or more retailers 158 may comprise any online or brick and mortar location, including locations with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers 158 based on computer-generated instructions or automatically by machinery to place products in a desired location.

Although one or more suppliers 152, one or more manufacturers 154, one or more distribution centers 156, and one or more retailers 158 are shown and described as separate and distinct entities, the same entity may simultaneously act as any other one or more suppliers 152, one or more manufacturers 154, one or more distribution centers 156, and/or one or more retailers 158. For example, one or more supply chain entities 150 acting as a manufacturer may produce a product, and the same entity may act as one or more suppliers 152 to supply a product to another one or more supply chain entities 150. Although one example of supply chain network 100 is shown and described, embodiments contemplate any configuration of supply chain network 100, without departing from the scope of the present disclosure.

As shown in FIG. 1, supply chain network 100 comprising reverse logistics system 110, planning and execution system 120, transportation network 130, archiving system 140, and one or more supply chain entities 150 may operate on one or more computers 160 that are integral to, or separate from, the hardware and/or software that support reverse logistics system 110, planning and execution system 120, transportation network 130, archiving system 140, and one or more supply chain entities 150. One or more computers 160 may include any suitable input device 162, such as a keypad, mouse, touch screen, microphone, or other device to input information. Output device 164 may convey information associated with the operation of supply chain network 100, including digital or analog data, visual information, or audio information. One or more computers 160 may include fixed or removable computer-readable storage media, including a non-transitory computer-readable medium, magnetic computer disks, flash drives, CD-ROM, in-memory device, or other suitable media to receive output from, and provide input to, supply chain network 100.

One or more computers 160 may include one or more processors 166 and associated memory to execute instructions and manipulate information according to the operation of supply chain network 100 and any of the methods described herein. In addition, or as an alternative, embodiments contemplate executing the instructions on one or more computers 160 that cause one or more computers 160 to perform functions of the methods. An apparatus implementing special purpose logic circuitry, such as, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system, including, but not limited to, a serverless cloud computing system, having processing and storage devices at one or more locations local to, or remote from, reverse logistics system 110, planning and execution system 120, transportation network 130, archiving system 140, and one or more supply chain entities 150. In addition, each of one or more computers 160 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with reverse logistics system 110 and archiving system 140. These one or more users may include, for example, an "administrator" handling machine learning model training, administration of cloud computing systems, and/or one or more related tasks within supply chain network 100. In the same or another embodiment, one or more users may be associated with planning and execution system 120 and/or one or more supply chain entities 150.

In one embodiment, reverse logistics system 110 may be coupled with network 170 using communication link 172, which may be any wireline, wireless, or other link suitable to support data communications between reverse logistics system 110 and network 170 during operation of supply chain network 100. Planning and execution system 120 may be coupled with network 170 using communication link 174, which may be any wireline, wireless, or other link suitable to support data communications between planning and execution system 120 and network 170 during operation of supply chain network 100. Transportation network 130 may be coupled with network 170 using communication link 176, which may be any wireline, wireless, or other link suitable to support data communications between transportation network 130 and network 170 during operation of supply chain network 100. Archiving system 140 may be coupled with network 170 using communication link 178, which may be any wireline, wireless, or other link suitable to support data communications between archiving system 140 and network 170 during operation of supply chain network 100. One or more supply chain entities 150 may be coupled with network 170 using communication link 180, which may be any wireline, wireless, or other link suitable to support data communications between one or more supply chain entities 150 and network 170 during operation of supply chain network 100. One or more computers 160 may be coupled with network 170 using communication link 182, which may be any wireline, wireless, or other link suitable to support data communications between one or more computers 160 and network 170 during operation of supply chain network 100. Although communication links 172-182 are shown as generally coupling reverse logistics system 110, planning and execution system 120, transportation network 130, archiving system 140, one or more supply chain entities 150, and one or more computers 160 to network 170, any of reverse logistics system 110, planning and execution system 120, transportation network 130, archiving system 140, one or more supply chain entities 150, and one or more computers 160 may communicate directly with each other, according to particular needs.

In another embodiment, network 170 includes the Internet and any appropriate local area networks (LANs), metropolitan area networks (MANs), or wide area networks (WANs) coupling reverse logistics system 110, planning and execution system 120, transportation network 130, archiving system 140, one or more supply chain entities 150, and one or more computers 160. For example, data may be maintained locally to, or externally of, reverse logistics system 110, planning and execution system 120, transportation network 130, archiving system 140, one or more supply chain entities 150, and one or more computers 160 and made available to one or more associated users of reverse logistics system 110, planning and execution system 120, transportation network 130, archiving system 140, one or more supply chain entities 150, and one or more computers 160 using network 170 or in any other appropriate manner. For example, data may be maintained in a cloud database at one or more locations external to reverse logistics system 110, planning and execution system 120, transportation network 130, archiving system 140, one or more supply chain entities 150, and one or more computers 160 and made available to one or more associated users of reverse logistics system 110, planning and execution system 120, transportation network 130, archiving system 140, one or more supply chain entities 150, and one or more computers 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

FIG. 2 illustrates reverse logistics system 110, archiving system 140, and planning and execution system 120 of FIG. 1 in greater detail, in accordance with an embodiment. Reverse logistics system 110 may comprise server 112 and database 114, as described above. Although reverse logistics system 110 is shown as comprising a single server 112 and a single database 114, embodiments contemplate reverse logistics system 110 comprising any suitable number of servers or databases, serverless computing options, or data stores internal to, or externally coupled with, reverse logistics system 110, according to particular needs.

Server 112 of reverse logistics system 110 comprises demand module 202, supply module 204, cost comparison module 206, logistics planning module 208, and user interface module 210. Although server 112 is shown and described as comprising a single demand module 202, a single supply module 204, a single cost comparison module 206, a single logistics planning module 208, and a single user interface module 210, embodiments contemplate any suitable number or combination of these located at one or more locations local to, or remote from, reverse logistics system 110, such as on multiple servers or computers 160 at one or more locations in supply chain network 100. Embodiments of reverse logistics system 110 may utilize serverless computing options to execute the processes of demand module 202, supply module 204, cost comparison module 206, logistics planning module 208, and user interface module 210.

In an embodiment, demand module 202 predicts demand levels for one or more items at one or more supply sites of one or more supply chain entities 150. Demand module 202 may predict the demand at several different types of supply sites, including one or more distribution centers 156, one or more retailers 158, or any other site in supply chain network 100 that may store inventory. According to embodiments, demand module 202 predicts demand based, at least in part, on impacted customers associated with the one or more supply sites. Demand module 202 may derive impacted customers from, for example, historic demand data, such as which customers the demand belonged to in the past. Demand module 202 may derive the impact for a specific customer level, customer category, or customer status, such as customers with preferred status or that are at a certain membership or loyalty level.

Supply module 204 determines on-hand and expected future inventory for the one or more items. Supply module 204 may consider, for example, the inventory currently available at the one or more supply sites, expected shipments, promised orders for the one or more items, and already-placed orders for the one or more items. According to embodiments, supply module 204 also derives a likelihood of service level agreement (SLA) fulfillment for the predicted demand at the one or more supply sites and predicts when the one or more supply sites is likely to have excess inventory supply or an inventory shortage based on the expected future inventory levels and the demand predicted by demand module 202.

Cost comparison module 206 calculates the cost of transferring the one or more items between the one or more supply sites using reverse logistics and the cost of obtaining additional inventory of the one or more items via other options. For example, cost comparison module 206 may consider reverse logistics costs, such as the location of excess inventory, the location of inventory shortage, transportation costs, contract details, carrier information, inventory verification costs, quality control costs, and the like, to calculate the cost of transferring the one or more items between the one or more supply sites using reverse logistics. As described in further detail below, cost comparison module 206 may also consider various factors that influence the cost of obtaining new inventory, such as manufacturing costs, procurement costs, costs to transfer the new inventory, and the like. In embodiments, based on the calculated costs, cost comparison module 206 determines whether the cost of transferring the one or more items between the one or more supply sites using reverse logistics is less than the cost of obtaining inventory of the one or more items via other options.

Logistics planning module 208 determines, based on the results of the cost comparison, whether to perform reverse logistics to transfer inventory between the one or more supply sites. When logistics planning module 208 determines that reverse logistics is more efficient, logistics planning module 208 generates a reverse logistics plan for the inventory, which may include transportation methods, vehicles, loading orders, special shipping or holding requirements, and any other information that may be necessary to transfer the inventory between the one or more supply sites. In some embodiments, logistics planning module 208 identifies an existing reverse logistics contract between one or more supply chain entities 150 associated with the one or more supply sites involved in the reverse logistics plan. When there is no existing contract, logistics planning module 208 may automatically generate and transmit a dynamic contract to the one or more supply chain entities 150 to execute the reverse logistics plan.

User interface module 210 of reverse logistics system 110 generates and displays a user interface (UI), such as, for example, a graphical user interface (GUI), that displays return data, visual data relating to reverse logistics costs (including, for example, maps, charts, and/or graphs), or any other visual representations of data of reverse logistics system 110. According to embodiments, user interface module 210 displays a GUI comprising interactive graphical elements for selecting one or more reverse logistics plans and/or data of any kind stored in database 114 of reverse logistics system 110 and, in response to the selection, displays the selected data on one or more display devices. The data from the UI may also be displayed in other UIs from any other systems or modules throughout supply chain network 100, such as, for example, a transportation manager, a demand forecasting module, or any other integration. In some embodiments, user interface module 210 may present a GUI that enables a user to override a recommended reverse logistics plan. In such embodiments, a hold may be applied on execution of the reverse logistics plan until a user (such as, for example, an administrator or manager) approves or denies the override or approves a modified version of the reverse logistics plan. Overrides may be used as feedback for reinforcement learning to further improve reverse logistics system 110. According to embodiments, user interface module 210 may also transmit notifications or other communications to one or more supply chain entities 150 regarding predicted excess inventory levels and inventory shortages. User interface module 210 may display the notifications to a user of reverse logistics system 110 via one or more output devices, such as, for example, output device 164 of one or more computers 160.

Database 114 of reverse logistics system 110 may comprise, according to embodiments, one or more databases, data stores, or other data storage arrangements at one or more locations local to, or remote from, server 112. In an embodiment, database 114 of reverse logistics system 110 comprises demand data 220, supply site data 222, transportation data 224, new inventory data 226, and logistics plan data 228. Although database 114 of reverse logistics system 110 is shown and described as comprising demand data 220, supply site data 222, transportation data 224, new inventory data 226, and logistics plan data 228, embodiments contemplate any suitable number or combination of these located at one or more locations local to, or remote from, reverse logistics system 110, according to particular needs.

In an embodiment, demand data 220 comprises predicted demands for one or more items in supply chain network 100, as described in greater detail above. For example, demand data 220 may comprise demand for all supply types included in an order at all supply sites within a certain distance of a particular one or more supply chain entities 150 with an inventory surplus. In embodiments, demand data 220 may be generated by demand module 202 and used by cost comparison module 206 to determine whether to perform reverse logistics for obtaining inventory of one or more items.

Supply site data 222 comprises all data associated with inventory supply locations or supply sites within supply chain network 100. For example, supply sites may include one or more distribution centers 156, warehouses, one or more retailers 158, transportation hubs, consolidation nodes, or any other location where inventory may be stored temporarily or on a long-term basis. Supply site data 222 may include historical sales data for items stored at the supply sites, historical demand for items stored at the supply sites, pricing and promotional data for items stored at the supply sites, inventory levels for items stored at the supply sites, promised inventory for items stored at the supply sites, purchase orders, or any other data associated with the supply sites. Supply module 204 may use supply site data 222 to determine on-hand and expected future inventory levels for supply sites and predict a likelihood of SLAs being met at supply sites. According to embodiments, supply site data 222 also comprises all data associated with customers of one or more supply chain entities 150. For example, the data associated with the customers may include purchase history data of the customers, customer profile data, customer value or preferred status data, customer locations, fulfillment centers or other nodes associated with the customers, or any other data related to the customers. Supply site data 222 may be generated by supply module 204 and used by cost comparison module 206 to determine whether to perform reverse logistics for obtaining inventory of one or more items.

Transportation data 224 includes all data related to transportation of items within supply chain network 100, including transportation costs. In embodiments, cost comparison module 206 may calculate transportation costs for shipping items based, at least in part, on carrier contracts, shipping distances, and vehicle costs. In other embodiments, transportation cost may be master data that depends on the rates of logistics partners and/or organizations that are not controlled by supply chain network 100. In such embodiments, the transportation cost master data may be hosted on databases separate from reverse logistics system 110 and transmitted to reverse logistics system 110 to compare inventory costs. Transportation data 224 may be used by cost comparison module 206 to determine whether to perform reverse logistics for obtaining inventory of one or more items.

New inventory data 226 comprises data related to costs of obtaining new inventory at supply sites that are likely to face a shortage of inventory. For example, new inventory data 226 may include data related to costs of obtaining new inventory by manufacturing new items (e.g., raw material costs), labor costs, transportation costs to ship the new inventory from one or more manufacturers 154 to the supply sites, and the like. New inventory data 226 may also include data related to costs of obtaining new inventory by procurement, such as current prices or market factors, contract details or obligations, transportation costs to ship the new inventory from one or more suppliers 152 to the supply site, and the like. According to embodiments, new inventory data 226 may be used by cost comparison module 206 to determine whether to perform reverse logistics for obtaining inventory of one or more items.

Logistics plan data 228 comprises reverse logistics plans generated by logistics planning module 208. As described in greater detail above, a reverse logistics plan may include any information necessary to transfer inventory between one or more supply chain entities 150, such as employees or employee groups assigned to the transfer, vehicles to be used in the transfer, loading or storage plans, shipping routes, special shipping or handling instructions or requirements, or any other transportation information. In embodiments, logistics plan data 228 may be implemented by reverse logistics system 110, planning and execution system 120, or any other system of supply chain network 100 by displaying instructions to one or more output devices, such as output device 164 of one or more computers 160.

As discussed above, archiving system 140 comprises server 142 and database 144. Although archiving system 140 is shown as comprising a single server 142 and a single database 144, embodiments contemplate any suitable number of servers or databases internal to, or externally coupled with, archiving system 140.

Server 142 of archiving system 140 comprises data retrieval module 230. Although server 142 is shown and described as comprising a single data retrieval module 230, embodiments contemplate any suitable number or combination of data retrieval modules located at one or more locations local to, or remote from, archiving system 140, such as on multiple servers or computers 160 at one or more locations in supply chain network 100.

In one embodiment, data retrieval module 230 of archiving system 140 receives historical supply chain data 240 from planning and execution system 120 and one or more supply chain entities 150 and stores received historical supply chain data 240 in archiving system 140 database 144. According to one embodiment, data retrieval module 230 may prepare historical supply chain data 240 for use as training data by checking historical supply chain data 240 for errors and transforming historical supply chain data 240 to normalize, aggregate, and/or rescale historical supply chain data 240 to allow direct comparison of data received from planning and execution system 120, one or more supply chain entities 150, and/or one or more other locations local to, or remote from, archiving system 140. According to embodiments, data retrieval module 230 may receive data from one or more sources external to supply chain network 100, such as, for example, weather data, special events data, social media data, calendar data, and the like, and store the received data as historical supply chain data 240.

Database 144 of archiving system 140 may comprise one or more databases or other data storage arrangements at one or more locations local to, or remote from, server 142. Database 144 of archiving system 140 comprises, for example, historical supply chain data 240. Although database 144 of archiving system 140 is shown and described as comprising historical supply chain data 240, embodiments contemplate any suitable number or combination of data located at one or more locations local to, or remote from, archiving system 140, according to particular needs.

Historical supply chain data 240 comprises historical data received from reverse logistics system 110, planning and execution system 120, one or more supply chain entities 150, and/or one or more computers 160. Historical supply chain data 240 may comprise, for example, weather data, special events data, social media data, calendar data, and the like. In an embodiment, historical supply chain data 240 may comprise, for example, historic sales patterns, prices, promotions, weather conditions, and other factors influencing future demand of the number of one or more items sold in one or more stores over a time period, such as, for example, one or more days, weeks, months, or years, including, for example, a day of the week, a day of the month, a day of the year, a week of the month, a week of the year, a month of the year, special events, paydays, and the like.

As discussed above, planning and execution system 120 comprises server 122 and database 124. Although planning and execution system 120 is shown as comprising a single server 122 and a single database 124, embodiments contemplate any suitable number of servers or databases internal to, or externally coupled with, planning and execution system 120.

In embodiments, server 122 of planning and execution system 120 comprises planning module 250 and prediction module 252. Although server 122 is shown and described as comprising a single planning module 250 and a single prediction module 252, embodiments contemplate any suitable number or combination of planning modules and prediction modules located at one or more locations local to, or remote from, planning and execution system 120, such as on multiple servers or computers 160 at one or more locations in supply chain network 100.

Database 124 of planning and execution system 120 may comprise one or more databases or other data storage arrangements at one or more locations local to, or remote from, server 122. Database 124 of planning and execution system 120 comprises, for example, transaction data 260, supply chain data 262, product data 264, inventory data 266, capacity data 268, store data 270, customer data 272, demand forecasts 274, supply chain models 276, and prediction models 278. Although database 124 of planning and execution system 120 is shown and described as comprising transaction data 260, supply chain data 262, product data 264, inventory data 266, capacity data 268, store data 270, customer data 272, demand forecasts 274, supply chain models 276, and prediction models 278, embodiments contemplate any suitable number or combination of data located at one or more locations local to, or remote from, planning and execution system 120, according to particular needs.

Planning module 250 of planning and execution system 120 works in connection with prediction module 252 to generate a plan based on one or more predicted retail volumes, classifications, or other predictions. By way of example and not of limitation, planning module 250 may comprise a demand planner that generates a demand forecast for one or more supply chain entities 150. Planning module 250 may generate the demand forecast, at least in part, from predictions and calculated factor values for one or more causal factors received from prediction module 252. By way of a further example, planning module 250 may comprise an assortment planner and/or a segmentation planner that generates product assortments that match causal effects calculated for one or more customers or products by prediction module 252, which may provide for increased customer satisfaction and sales, as well as reduce costs for shipping and stocking products at stores where they are unlikely to sell.

Prediction module 252 of planning and execution system 120 applies samples of transaction data 260, supply chain data 262, product data 264, inventory data 266, store data 270, customer data 272, demand forecasts 274, and other data to prediction models 278 to generate predictions and calculated factor values for one or more causal factors. Prediction module 252 of planning and execution system 120 may predict a volume Y (target) from a set of causal factors X along with causal factors strengths that describe the strength of each causal factor variable contributing to the predicted volume. According to some embodiments, prediction module 252 generates predictions at daily intervals. However, embodiments contemplate longer and shorter prediction phases that may be performed, for example, weekly, twice a week, twice a day, hourly, or the like.

Transaction data 260 of planning and execution system 120 may comprise recorded sales and returns transactions and related data, including, for example, a transaction identification, time and date stamp, channel identification (such as stores or online touchpoints), product identification, actual cost, selling price, sales volume, customer identification, promotions, and/or the like. In addition, transaction data 260 is represented by any suitable combination of values and dimensions, aggregated or disaggregated, such as, for example, sales per week, sales per week per location, sales per day, sales per day per season, or the like.

Supply chain data 262 may comprise any data of one or more supply chain entities 150 including, for example, item data, identifiers, metadata (comprising dimensions, hierarchies, levels, members, attributes, cluster information, and member attribute values), fact data (comprising measure values for combinations of members), business constraints, goals, and objectives of one or more supply chain entities 150.

Product data 264 of database 124 may comprise products identified by, for example, a product identifier (such as a Stock Keeping Unit (SKU), Universal Product Code (UPC), or the like) and one or more attributes and attribute types associated with the product ID. Product data 264 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 266 of database 124 may comprise any data relating to current or projected inventory quantities or states, order rules, or the like. For example, inventory data 266 may comprise the current level of inventory for each item at one or more stocking points across supply chain network 100. In addition, inventory data 266 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 120 accesses and stores inventory data 266 in database 124, which may be used by planning and execution system 120 to place orders, set inventory levels at one or more stocking points, initiate manufacturing of one or more components, or the like.

In embodiments, inventory data 266 may also comprise one or more inventory policies. The inventory policies may comprise any suitable inventory policy describing the reorder point and target quantity, or other inventory policy parameters that set rules for planning and execution system 120 to manage and reorder inventory. The inventory policies may be based on target service level, demand, cost, fill rate, or the like. According to embodiments, the inventory policies comprise target service levels that ensure that a service level of one or more supply chain entities 150 is met with a set probability. For example, one or more supply chain entities 150 may set a service level at 95%, meaning one or more supply chain entities 150 sets the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, planning and execution system 120 may determine a replenishment order according to one or more replenishment rules, which, among other things, indicates to one or more supply chain entities 150 to determine or receive inventory to replace the depleted inventory. By way of example only and not by way of limitation, an inventory policy for non-perishable goods with linear holding and shorting costs comprises a min./max. (s,S) inventory policy. Other inventory policies may be used for perishable goods, such as fruit, vegetables, dairy, and fresh meat, as well as electronics, fashion, and similar items for which demand drops significantly after a next generation of electronic devices or a new season of fashion is released.

Capacity data 268 of database 124 may comprise any data relating to current or projected resource capacity values or states, order rules, or the like. For example, capacity data 268 may comprise the current level of capacity for each task at one or more locations across supply chain network 100. In addition, capacity data 268 may comprise order rules that describe one or more rules or limits on setting a capacity policy, including, but not limited to, a minimum order capacity, a maximum order capacity, a discount, a step-size order capacity, and batch quantity rules. According to some embodiments, planning and execution system 120 accesses and stores capacity data 268 in database 124, which may be used by planning and execution system 120 to place orders, set capacity levels at one or more locations in supply chain network 100, initiate manufacturing of one or more components, or the like.

In embodiments, capacity data 268 may include one or more capacity policies. The capacity policies may comprise any suitable capacity policy describing the reorder point and target quantity, or other capacity policy parameters that set rules for planning and execution system 120 to manage capacity. The capacity policies may be based on target service level, demand, cost, or the like. According to embodiments, the capacity policies comprise target service levels that ensure that a service level of one or more supply chain entities 150 is met with a set probability. For example, one or more supply chain entities 150 may set a service level at 95%, meaning one or more supply chain entities 150 sets the desired capacity level at a level that meets demand 95% of the time.

Store data 270 may comprise data describing the stores of one or more retailers 158 and related store information. Store data 270 may comprise, for example, a store ID, store description, store location details, store location climate, store type, store opening date, lifestyle, store area (expressed in, for example, square feet, square meters, or other suitable measurement), latitude, longitude, and other similar data.

Customer data 272 of planning and execution system 120 may comprise customer identity information, including, for example, customer relationship management data, loyalty programs, and mappings between product purchases and one or more customers so that a customer associated with a transaction may be identified. Customer data 272 may further comprise data relating customer purchases to one or more products, geographical regions, store locations, or other types of dimensions. In an embodiment, customer data 272 may also comprise customer profile information, including demographic information and preferences.

Demand forecasts 274 of database 124 may indicate expected future demand based on, for example, any data relating to past sales, past demand, purchase data, promotions, events, or the like of one or more supply chain entities 150. Demand forecasts 274 may cover a time interval such as, for example, by the minute, by the hour, daily, weekly, monthly, quarterly, yearly, or any other suitable time interval, including substantially in real time. In some embodiments, demand may be modeled as a negative binomial or Poisson-Gamma distribution. According to other embodiments, the model also takes into account shelf-life of perishable goods (which may range from days (e.g., fresh fish or meat) to weeks (e.g., butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. By way of example only and not by way of limitation, an exemplary supermarket may stock twenty thousand items at one thousand locations. When each location of this exemplary supermarket is open every day of the year, planning and execution system 120 needs to calculate approximately $2 \times 10^{10}$ demand forecasts 274 each day to derive the optimal order volume for the next delivery cycle (e.g., three days).

Supply chain models 276 of database 124 comprise characteristics of a supply chain setup to deliver the customer expectations of a particular customer business model. These characteristics may comprise differentiating factors, such as, for example, MTO (Make-to-Order), ETO (Engineer-to-Order), or MTS (Make-to-Stock). However, supply chain models 276 may also comprise characteristics that specify the supply chain structure in even more detail, including, for example, specifying the type of collaboration with the customer (e.g., Vendor-Managed Inventory (VMI)), from where products may be sourced, and how products may be allocated, shipped, or paid for by particular customers. Each of these characteristics may lead to a different supply chain model. Prediction models 278 comprise one or more of the trained models used by planning and execution system 120 for predicting, among other variables, pricing, targeting, or retail volume, such as, for example, a forecasted demand volume for one or more products at one or more stores of one or more retailers 158 based on the prices of the one or more products.

FIG. 3 illustrates method 300 for reverse logistics of inventory, in accordance with an embodiment. Method 300 may be performed by a reverse logistics system, such as reverse logistics system 110 of FIG. 1. Method 300 proceeds by one or more activities, which although described in a particular order, may be performed in one or more permutations, combinations, orders, or repetitions, according to particular needs.

At activity 302, logistics planning module 208 of reverse logistics system 110 identifies existing reverse logistics contracts between one or more supply chain entities 150 of supply chain network 100, which may include details or obligations for the way in which to transfer inventory during reverse logistics. In some embodiments, logistics planning module 208 may access a database of contract details, such as, for example, new inventory data 226 of database 114, to identify existing reverse logistics contracts. In other embodiments, logistics planning module 208 may receive a notification from one or more supply chain entities 150 that a reverse logistics contract has been established. In still other embodiments, logistics planning module 208 may use communications among one or more supply chain entities 150 to identify existing reverse logistics contracts.

At activity 304, demand module 202 of reverse logistics system 110 predicts demand for an item sold within supply chain network 100. According to embodiments, individual sellers of supply chain network 100, such as, for example, a retail store of one or more retailers 158, utilize demand module 202 to predict the demand for the item with respect to the individual sellers. At activity 306, supply module 204 of reverse logistics system 110 predicts that a first supply chain entity of one or more supply chain entities 150 is likely to have excess inventory for the item based on expected future inventory of the item and the demand for the item predicted at activity 304. In embodiments, the first supply chain entity, such as a seller within supply chain network 100, utilizes supply module 204, or one or more other systems or modules of supply chain network 100, to predict the excess inventory situation and transmit a notification of the expected inventory excess to reverse logistics system 110.

At activity 308, user interface module 210 of reverse logistics system 110 notifies other supply chain entities of one or more supply chain entities 150 of the excess inventory at the first supply chain entity. The other supply chain entities may include, for example, one or more distribution centers 156, one or more manufacturers 154, or any other supply chain entity that may store inventory, including supply chain entities that are upstream from the first supply chain entity. In some embodiments, the first supply chain entity may notify the other supply chain entities directly, such as via a message between managers or administrators, or an automated transmission between inventory systems associated with the first supply chain entity and the other supply chain entities.

At activity 310, supply module 204 predicts an inventory shortage at a second supply chain entity of supply chain network 100. In embodiments, other supply chain entities utilize supply module 204, or one or more other systems or modules of supply chain network 100, to evaluate a likelihood of inventory shortage and, when an inventory shortage is likely, transmit a notification of the shortage to reverse logistics system 110 via user interface module 210. At activity 312, supply module 204 identifies a specific supply site, such as a particular retail store, warehouse, distribution center, or any other inventory storage site within supply chain network 100, of the second supply chain entity that needs the additional supply of the item.

At activity 314, cost comparison module 206 of reverse logistics system 110 compares the cost of transferring the excess inventory from the first supply chain entity to the second supply chain entity with the cost of other options of the second supply chain entity obtaining additional inventory, such as manufacturing additional inventory or procuring additional inventory from one or more suppliers 152. According to embodiments, reverse logistics system 110 may perform method 500 described below with reference to FIG. 5 to compare the costs of obtaining inventory at the second supply chain entity.

At activity 316, when cost comparison module 206 determines that the cost of the performing reverse logistics to transfer inventory from the first supply chain entity to the second supply chain entity is less than the cost of the second supply chain entity obtaining additional inventory via other options, logistics planning module 208 generates a reverse logistics plan and initiates reverse logistics to transfer inventory from the first supply chain entity to the location of the second supply chain entity determined at activity 316. In embodiments, one or more supply chain entities 150 may utilize one or more pieces of automatic machinery, such as, for example, automated warehousing systems 157, to execute the reverse logistics plan.

To further illustrate the operation of method 300 described above, the following non-limiting example is provided. In this example, Seller A operates a worldwide store and has a tie-up with Distributor B, which logistics planning module 208 identifies as an existing reverse logistics contract at activity 302. Distributor B has significant on-hand inventory for a particular jacket within its Region C network, while Seller A has a smaller on-hand inventory for the jacket in its Region D stores. At activity 304, demand module 202 predicts that the demand for the jacket is higher than the on-hand inventory of Seller A in Region D and less than the on-hand inventory of Distributor B in Region C. At activity 306, supply module 204 predicts that Distributor B is likely to have excess supply of the jacket in Region C throughout the next month and, at activity 308, user interface module 210 notifies other supply chain entities, including Seller A, of the predicted excess supply of the jacket. At activity 310, supply module 204 predicts that Seller A is likely to face a supply shortage of the jacket at a particular group of stores in Region D after the next month, which supply module 204 identifies as supply sites that are likely to have an inventory shortage at activity 312. At activity 314, cost comparison module 206 calculates the cost of transferring excess inventory of the jacket from Distributor B to the group of stores of Seller A using reverse logistics with the cost of other options for which Seller A may obtain additional inventory, such as manufacturing more inventory of the jacket. In this example, the cost of transferring the excess inventory is less than the cost of obtaining the additional inventory using other options. At activity 316, logistics planning module 208 generates a reverse logistic plan that includes an offer of a buy-back with a 10% increment to Distributor B, which Distributor B accepts to make a net 10% on the excess jacket inventory. Logistics planning module 208 further initiates shipping of the bought-back inventory from warehouses of Distributor B to the stores of Seller A in Region D with the inventory arriving ahead of the expected supply shortage, which enables Distributor B to generate a 10% profit on the excess inventory instead of a loss from selling the inventory at a markdown and enables Seller A to meet demand for the jacket and avoid lost sales.

FIG. 4 illustrates method 400 for reverse logistics of inventory using dynamic contracting, in accordance with an embodiment. Method 400 may be performed by a reverse logistics system, such as reverse logistics system 110 of FIG. 1. Method 400 proceeds by one or more activities, which although described in a particular order, may be performed in one or more permutations, combinations, orders, or repetitions, according to particular needs.

At activity 402, demand module 202 of reverse logistics system 110 predicts demand for an item sold within supply chain network 100. In embodiments, individual sellers of supply chain network 100, such as, for example, a retail store, utilize demand module 202 to predict the demand for the item with respect to the individual sellers. At activity 404, supply module 204 of reverse logistics system 110 predicts that a first supply chain entity of one or more supply chain entities 150 is likely to have excess inventory for the item based on expected future inventory of the item and the demand for the item predicted at activity 402. In embodiments, the first supply chain entity, such as a seller within supply chain network 100, utilizes supply module 204, or one or more other systems or modules of supply chain network 100, to predict the excess inventory situation and transmit a notification of the expected inventory excess to reverse logistics system 110.

At activity 406, user interface module 210 of reverse logistics system 110 notifies other supply chain entities of one or more supply chain entities 150 of the excess inventory at the first supply chain entity. For example, the other supply chain entities may include one or more distribution centers 156, one or more manufacturers 154, or any other supply chain entity that may store inventory, including upstream supply chain entities. In some embodiments, the first supply chain entity may notify the other supply chain entities directly, such as via a message between managers or administrators, or an automated transmission between inventory systems associated with the first supply chain entity and the other supply chain entities.

At activity 408, supply module 204 predicts an inventory shortage at a second supply chain entity of supply chain network 100. In embodiments, the other supply chain entities utilize supply module 204, or one or more other systems or modules of supply chain network 100, to evaluate a likelihood of inventory shortage and, when an inventory shortage is likely, transmit a notification of the shortage to reverse logistics system 110. At activity 410, supply module 204 identifies a specific supply site, such as a particular retail store, warehouse, distribution center, or any other inventory storage site within supply chain network 100, of the second supply chain entity that needs the additional supply of the item.

At activity 412, cost comparison module 206 of reverse logistics system 110 compares the cost of transferring the excess inventory from the first supply chain entity to the second supply chain entity with the cost of other options of the second supply chain entity obtaining additional inventory, such as manufacturing additional inventory or procuring additional inventory from one or more suppliers 152. According to embodiments, reverse logistics system 110 may perform method 500 described below with reference to FIG. 5 to compare the costs of obtaining inventory at the second supply chain entity.

At activity 414, when cost comparison module 206 determines that the cost of performing reverse logistics to transfer inventory from the first supply chain entity to the second supply chain entity is less than the cost of the second supply chain entity obtaining additional inventory via other options, logistics planning module 208 of reverse logistics system 110 generates and transmits a reverse logistics contract offer for the other supply chain entities of supply chain network 100, including the first supply chain entity with the excess inventory. In embodiments, the reverse logistics contract offer may include a price or price range for the other supply chain entities to sell excess inventory directly to the second supply chain entity.

At activity 416, user interface 210 receives acceptance of the reverse logistics contract offer from one or more supply chain entities 150, such as, for example, the first supply chain entity with the excess inventory. At activity 418, logistics planning module 208 generates a dynamic contract and initiates a reverse logistics plan to transfer excess inventory of the item from the supply chain entity that accepts the reverse logistics contract offer to the second supply chain entity based on the dynamic contract. In embodiments, when multiple supply chain entities accept the offer, logistics planning module 208 may generate a dynamic contract between the second supply chain entity and an entity that accepts the reverse logistics contract offer at the lowest price.

Figure 5:
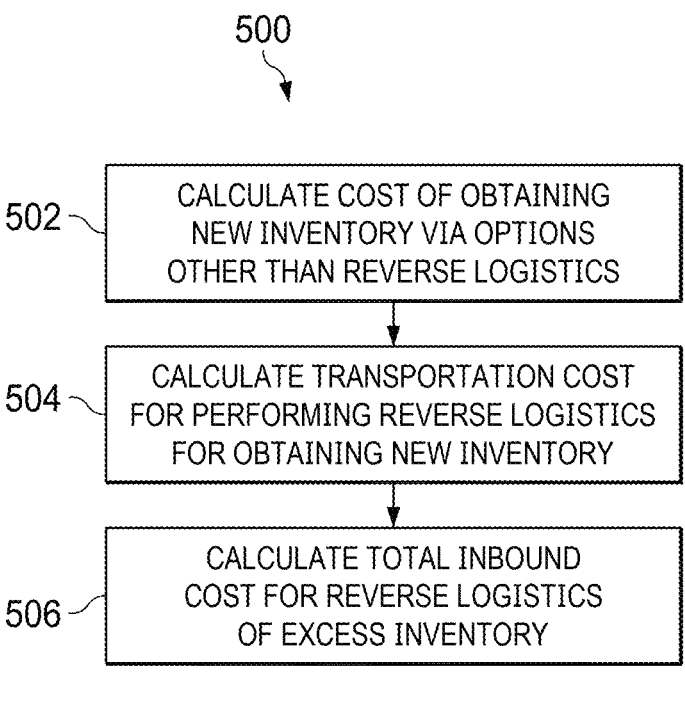
FIG. 5 illustrates a method for comparing costs of obtaining inventory, in accordance with an embodiment.

FIG. 5 illustrates method 500 for comparing costs of obtaining inventory, in accordance with an embodiment. Method 500 may be performed by a reverse logistics system, such as reverse logistics system 110 of FIG. 1. Method 500 proceeds by one or more activities, which although described in a particular order, may be performed in one or more permutations, combinations, orders, or repetitions, according to particular needs.

At activity 502, cost comparison module 206 of reverse logistics system 110 calculates the cost of obtaining new inventory via options other than reverse logistics. In embodiments, cost comparison module 206 considers factors such as details of an excess inventory location and a shortage location, which may be stored in supply site data 222, as well as manufacturing costs, transfer costs, procurement costs, or any other costs associated with obtaining new inventory, which may be stored in new inventory data 226.

At activity 504, cost comparison module 206 calculates a transportation cost for performing reverse logistics for obtaining new inventory. Cost comparison module 206 may consider transportation data 224, such as, for example, the geography of the excess inventory location and the shortage location, contractual obligations of the excess inventory location or the shortage location, and carrier information for the excess inventory location or the shortage location, to calculate the transportation cost. According to embodiments, transportation data 224 may be received by reverse logistics system 110 from data systems associated with one or more supply chain entities 150 or carriers.

At activity 506, cost comparison module 206 calculates a total inbound cost for reverse logistics of excess inventory. In embodiments, cost comparison module 206 calculates the total inbound cost using details of the excess inventory location and the shortage location, the transportation cost calculated at activity 504, and any additional inbound costs, including verification of inventory, quality checks or quality controls of inventory, special storage or handling costs for items with storage or handling requirements (e.g., items requiring refrigeration or special stacking), or any other inbound inventory costs. Thereafter, cost comparison module 206 may compare the cost of obtaining new inventory calculated at activity 502 with the total inbound cost for reverse logistics calculated at activity 506 to determine whether performing reverse logistics to obtain new inventory is more efficient than obtaining new inventory via other options. When performing reverse logistics to obtain new inventory is more efficient, reverse logistics system 110 may generate and implement a reverse logistics plan, as described in greater detail above.

Reference in the foregoing specification to "one embodiment", "an embodiment", or "some embodiments" means that a particular correlated factor, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for reverse logistics of inventory, comprising:
    a computer, comprising a processor and a memory, the computer configured to:
        identify one or more existing reverse logistics contracts between one or more supply chain entities of a supply chain network;
        predict demand for one or more items sold within the supply chain network;
        predict that a first supply chain entity of the one or more supply chain entities is likely to have excess inventory for the one or more items based on an expected future inventory of the one or more items and the predicted demand for the one or more items;
        notify one or more other supply chain entities of the one or more supply chain entities of the predicted excess inventory at the first supply chain entity;
        predict an inventory shortage at a second supply chain entity of the supply chain network;
        compare a cost of transferring the predicted excess inventory from the first supply chain entity to the second supply chain entity with a cost of other options of the second supply chain entity obtaining additional inventory;
        in response to determining that the cost of transferring the predicted excess inventory from the first supply chain entity to the second supply chain entity is less than the cost of the second supply chain entity obtaining additional inventory via the other options, generate a reverse logistics plan; and
        initiate and execute the reverse logistics plan using automated warehousing systems.

2. The system of claim 1, wherein the computer is further configured to:
    access a database of contract details to identify the one or more existing reverse logistics contracts.

3. The system of claim 1, wherein the computer is further configured to:
    transmit a notification of the predicted inventory excess.

4. The system of claim 1, wherein the one or more other supply chain entities comprise one or more distribution centers, one or more manufacturers, or another supply chain entity that may store inventory.

5. The system of claim 1, wherein the second supply chain entity comprises one or more of: a particular retail store, a warehouse, a distribution center, or another inventory storage site within the supply chain network.

6. The system of claim 1, wherein the computer is further configured to:

execute the reverse logistics plan by sending instructions to one or more automated warehousing systems.

7. The system of claim 1, wherein the cost of the other options comprises one or more of:

one or more manufacturing costs, one or more procurement costs and one or more transfer costs.

8. A computer-implemented method for reverse logistics of inventory, comprising:

identifying, by a computer comprising a processor and a memory, one or more existing reverse logistics contracts between one or more supply chain entities of a supply chain network;

predicting, by the computer, demand for one or more items sold within the supply chain network;

predicting, by the computer, that a first supply chain entity of the one or more supply chain entities is likely to have excess inventory for the one or more items based on an expected future inventory of the one or more items and the predicted demand for the one or more items;

notifying, by the computer, one or more other supply chain entities of the one or more supply chain entities of the predicted excess inventory at the first supply chain entity;

predicting, by the computer, an inventory shortage at a second supply chain entity of the supply chain network;

comparing, by the computer, a cost of transferring the predicted excess inventory from the first supply chain entity to the second supply chain entity with a cost of other options of the second supply chain entity obtaining additional inventory;

in response to determining, by the computer, that the cost of transferring the predicted excess inventory from the first supply chain entity to the second supply chain entity is less than the cost of the second supply chain entity obtaining additional inventory via the other options, generating, by the computer, a reverse logistics plan; and initiating and executing, by the computer, the reverse logistics plan using automated warehousing systems.

9. The computer-implemented method of claim 8, further comprising:

accessing, by the computer, a database of contract details to identify the one or more existing reverse logistics contracts.

10. The computer-implemented method of claim 8, further comprising:

transmitting, by the computer, a notification of the predicted inventory excess.

11. The computer-implemented method of claim 8, wherein the one or more other supply chain entities comprise one or more distribution centers, one or more manufacturers, or another supply chain entity that may store inventory.

12. The computer-implemented method of claim 8, wherein the second supply chain entity comprises one or more of: a particular retail store, a warehouse, a distribution center, or another inventory storage site within the supply chain network.

13. The computer-implemented method of claim 8, further comprising:

executing, by the computer, the reverse logistics plan by sending instructions to one or more automated warehousing systems.

14. The computer-implemented method of claim 8, wherein the cost of the other options comprises one or more of:

one or more manufacturing costs, one or more procurement costs and one or more transfer costs.

15. A non-transitory computer-readable medium embodied with software for reverse logistics of inventory, the software when executed is configured to:

identify, by a computer comprising a processor and a memory, one or more existing reverse logistics contracts between one or more supply chain entities of a supply chain network;

predict demand for one or more items sold within the supply chain network;

predict that a first supply chain entity of the one or more supply chain entities is likely to have excess inventory for the one or more items based on an expected future inventory of the one or more items and the predicted demand for the one or more items;

notify one or more other supply chain entities of the one or more supply chain entities of the predicted excess inventory at the first supply chain entity;

predict an inventory shortage at a second supply chain entity of the supply chain network;

compare a cost of transferring the predicted excess inventory from the first supply chain entity to the second supply chain entity with a cost of other options of the second supply chain entity obtaining additional inventory;

in response to determining that the cost of transferring the predicted excess inventory from the first supply chain entity to the second supply chain entity is less than the cost of the second supply chain entity obtaining additional inventory via the other options, generate a reverse logistics plan; and initiate and execute the reverse logistics plan using automated warehousing systems.

16. The non-transitory computer-readable medium of claim 15, wherein the software when executed is further configured to:

access a database of contract details to identify the one or more existing reverse logistics contracts.

17. The non-transitory computer-readable medium of claim 15, wherein the software when executed is further configured to:

transmit a notification of the predicted inventory excess.

18. The non-transitory computer-readable medium of claim 15, wherein the one or more other supply chain entities comprise one or more distribution centers, one or more manufacturers, or another supply chain entity that may store inventory.

19. The non-transitory computer-readable medium of claim 15, wherein the second supply chain entity comprises one or more of: a particular retail store, a warehouse, a distribution center, or another inventory storage site within the supply chain network.

20. The non-transitory computer-readable medium of claim 15, wherein the software when executed is further configured to:

execute the reverse logistics plan by sending instructions to one or more automated warehousing systems.

* * * * *